(12) United States Patent
Lampert et al.

(10) Patent No.: US 6,554,484 B2
(45) Date of Patent: Apr. 29, 2003

(54) OPTICAL CONNECTOR RECEPTACLE HAVING SWITCHING CAPABILITY

(75) Inventors: Norman R. Lampert, Norcross, GA (US); Joel L. Mock, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/748,906

(22) Filed: Dec. 27, 2000

(65) Prior Publication Data

US 2002/0081076 A1 Jun. 27, 2002

(51) Int. Cl.7 .................................................. G02B 6/38
(52) U.S. Cl. ......................................... 385/70; 439/489
(58) Field of Search ........................ 385/70, 60; 439/489, 439/188; 200/51.09

(56) References Cited

U.S. PATENT DOCUMENTS

| | | | | |
|---|---|---|---|---|
| 3,649,839 A | * | 3/1972 | Appleton | 250/215 |
| 4,008,403 A | * | 2/1977 | Rose | 200/51.09 |
| 4,903,340 A | * | 2/1990 | Sorensen | 385/31 |
| 4,978,310 A | * | 12/1990 | Shichida | 200/51.1 |
| 5,029,970 A | * | 7/1991 | Hengst et al. | 385/88 |
| 5,113,467 A | * | 5/1992 | Peterson et al. | 385/57 |
| 5,212,752 A | | 5/1993 | Stephenson et al. | 385/78 |
| 5,222,164 A | * | 6/1993 | Bass et al. | 250/208.2 |
| 5,274,729 A | | 12/1993 | King et al. | 385/134 |
| 5,334,034 A | * | 8/1994 | Reichardt et al. | 439/188 |
| 5,394,503 A | * | 2/1995 | Dietz, Jr. et al. | 385/89 |
| 5,570,445 A | * | 10/1996 | Chou et al. | 385/78 |
| 5,647,043 A | | 7/1997 | Anderson et al. | 385/78 |
| 5,687,268 A | * | 11/1997 | Stephenson et al. | 385/73 |
| 5,743,582 A | | 4/1998 | Rivera | 294/99.2 |
| 6,095,851 A | * | 8/2000 | Laity et al. | 439/490 |
| 6,176,718 B1 | * | 1/2001 | Skarie et al. | 439/188 |

* cited by examiner

Primary Examiner—Lynn Field
Assistant Examiner—Brian S. Webb
(74) Attorney, Agent, or Firm—Thomas, Kayden, Horstemeyer & Risley, LLP

(57) ABSTRACT

An optical fiber connector adapter has a sensing mechanism for determining when the adapter has a connector plug therein and when the adapter is vacant or empty. The sensing mechanism creates an indication of the state of the adapter which is transmitted to a control circuit. The control circuit responds to the indication by activating or deactivating a laser, for example, which applies optical energy to the adapter. The laser is deactivated when the adapter has no connector plug therein and is activated when there is a connector plug in place in the adapter. In two of the embodiments of the invention, the sensing mechanism signals the impending insertion or withdrawal of the connector plug relative to the adapter.

3 Claims, 9 Drawing Sheets

OPTICAL CONNECTOR RECEPTACLE HAVING SWITCHING CAPABILITY

FIELD OF THE INVENTION

This invention relates to optical connection adapters for use in fiber optical transmission and, more particularly, to an adapter for creating an electrical indication of the condition of the connector.

BACKGROUND OF THE INVENTION

Optical fiber transmission systems are becoming widely used in the transmission of signals such as data, voice and the like, and in many instances, are replacing traditional electrical systems. Many of the arrangements common to electrical systems, such as coupling, interconnection, splicing, and the like have their counterparts in optical systems but, because of the totally different characteristics of the transmission media, i.e., optical fiber versus metallic wire, connectorization, splicing, and the like involve quit a different apparatus. Where, for example, it is necessary to make a great number of connections in one location, both systems may use what is referred to in the art as patch panels, which provide arrays of connector adapters for interconnection, but the interconnections themselves are generally quite different.

It is common practice in the optical connector art to terminate a length of optical fiber with a connector, an example of which is the SC type connector that is shown and described in U.S. Pat. No. 5,212,752 of Stephenson et al. There are numerous types of such fiber terminating connectors, and, inasmuch as there has been little effort directed to standardization, each type of connector generally requires a different coupling arrangement to permit interconnection of two fibers, for example. The SC and LC connectors are becoming more and more popular, and the remainder of the discussion, in the interest of simplicity, is devoted to such connectors. It is to be understood that the following description of the principles and apparatus of the invention is applicable to other types of connectors as well. As is shown in the Stephenson et al. patent, an SC connector includes a ferrule assembly including a barrel having a collar at one end and an optical fiber terminating ferrule projecting from the barrel. The ferrule assembly is disposed in a plug frame such that an end portion of the ferrule projects from one end of the frame. The plug frame is configured to snap lock into a grip member having a locating key thereon, and the grip is inserted into one side of a slotted coupler adapter, with the locating key inserted into the slot. The grip of a corresponding SC connector is inserted into the other side of the adapter so that the ends of the ferrules abut each other to form a low insertion loss optical interconnection. In the SC connector, the ferrules are spring loaded longitudinally to insure contact between the fiber containing ferrule ends. The entire interconnect operation involves linear motion only and results in a low insertion loss, mechanically stable, protected junction between the two fibers. The expenditure of time in making the interconnection is small and the operator or installer is relieved of having to perform anything other than simple linear motion in plugging the connectors into the coupling adapter.

When large numbers of such interconnections are to be made, it is common practice to use patch panels for holding an array of a large number of coupler adapters. Thus, there can literally be hundreds of such adapters, all in close proximity to each other, mounted in the panel. As long as only a single type of connector, such as the SC connector, is involved, simple adapters may be used for plugging in the connectors from each side of the patch panel. In view of the fact that there are several different types of connectors in widespread use today, it has become common practice to replace the simple adapters with buildout blocks or buildout coupling adapters. In U.S. Pat. No. 5,274,729 of King, et al., there is shown a buildout coupling adapter system in a patch panel that makes possible interconnections among the several different types of connectors in any combination thereof. As can be seen in that patent, a buildout block at one side (or end) thereof is configured the same as a simple coupler adapter having a keyway for receiving, for example, an SC connector. The other end of the buildout block is formed to receive a buildout which may be configured to receive and hold, for example, an SC, an ST, an LC, or an FC connector. Thus, the patch panel may be, on one side thereof, pre-connectorized with optical fibers all of which are terminated by SC connectors, and the other side of the panel is ready to receive pre-connectorized fibers terminated by any one of the numerous connectors. Such an arrangement is more versatile and adaptable than those arrangements which are limited to a single type of pre-connectorized fiber. Such an arrangement also functions well in those installations where one side of the panel is not readily accessible. Thus, the panel can be pre-connectorized before mounting in position on the side which will be relatively inaccessible, after which it can be mounted in place, ready to receive the numerous connections thereto, regardless of connector type.

In any such arrangement there is a potential safety hazard that is often present. Where one or more of the pre-connectorized fibers is carrying optical energy, such energy can be emitted from the end of the fiber connector and pass through the unoccupied buildout block or coupling adapter to the side of the panel where connections are to be made. This optical energy can be harmful for the operator or installer and can be especially harmful to his or her eyes. This hazard is most prevalent when an active connection has to be repaired, cleaned, or otherwise altered by removing an existing connectorized fiber and replacing it with another. In such an instance, it might be difficult or otherwise impractical to shut off the signal transmission in that particular fiber circuit, hence, the installer is forced to deal with a light emitting junction or connection.

This hazard has long been recognized and there are numerous arrangements in the prior art for blocking any light emanating from a fiber connection through an open adapter. In U.S. Pat. No. 5,678,268 of Stephenson, et al., there is shown a pivotable optical shutter arrangement wherein a normally closed pivotable shutter blocks the open exit of an adapter when a connector plug is removed. The shutter advantageously requires only one motion to open it to permit insertion of a plug or connector into the adapter. Such a shutter as shown in the patent is operable by only one hand instead of prior art arrangements which generally require awkward use of two hands by the installer. One of the disadvantages of any shutter arrangement however, is that they are easily "defeatable" in that they can be, during installation of large numbers of connectors and in the interest of expedition, for example, temporarily fixed in the open position, thus contravening their purpose. In addition, the fiber optic transmission art has progressed to the use of higher and higher light energy or power, and has reached a point where shutter arrangements in general have, because of the large light energy, become transparent to much of that energy in the form of infra-red light, which is commonly used. Additionally, when the light intensity is very high, actual damage to the optical connector and the associated fibers can occur.

SUMMARY OF THE INVENTION

The present invention is an optical fiber connector adapter assembly wherein the adapter has a sensing mechanism comprising a switching arrangement incorporated therein for signaling associated circuitry to cut off the emission from the light source that supplies the connector plug remaining in the adapter when the first plug is removed. As a consequence, the cessation of light energy emanating from the open receptacle of the adapter assembly is complete, not subject to easy defeat, and eliminates or at least reduces the possibility of damage to the connection, fibers, and users. As will be apparent hereinafter, in some embodiments of the invention, an impending disconnect or connect is signaled, thereby eliminating possible injury to the installer during extraction of the first plug.

In a first illustrative embodiment of the invention, an adapter has first and second leaf springs extending into the plug receiving opening and positional to be pressed into contact with each other when a first plug is inserted into the adapter. The springs are attached to a suitable external circuit, such as a circuit board mounted on or adjacent the adapter, which, upon contact with each other by the leaf springs produces a control signal for turning on the light source, e.g., laser, connected to the second plug already in the adapter. Conversely, when the first plug is removed from the adapter, the circuit is broken and the laser to the second plug is turned off. Thus, the two leaf springs function as a safety switch to prevent light from emanating from an open adapter.

In a second illustrative embodiment of the invention, a light emitting device, such as an LED is mounted in one side wall of the adapter and a light detector in the opposite wall thereof. Thus, light, such as a beam, from the LED directed across the plug receiving portion of the adapter to the detector is detected thereby, in the absence of a first plug, and causes a signal to be directed to a suitable control circuit to prevent the light which normally is directed to a second plug from reaching the adapter generally by extinguishing the laser. When the first plug is inserted into the adapter, it blocks the light path between the LED and detector and the control signal circuit is broken, thereby allowing the laser to the second plug to be turned on.

In still another embodiment of the invention, a Hall effect device, which detects the presence of a magnetic field, is mounted in the adapter on, for example, an end wall thereof or on a circuit board mounted on or in the adapter. In this embodiment, the first plug has a small magnet mounted on the front plug end. When the first plug is inserted into the adapter it is moved forward until it seats therein, at which point the Hall effect device detects the presence of the magnet and produces a signal which, when applied to a control circuit, permits the light (laser) supplying the second plug to be turned on. When the first plug is removed, the magnet is no longer detected and the Hall effect device no longer produces a signal. In the absence of such a signal, the control circuit turns the laser off, or otherwise prevents light from reaching the connector end of the second plug.

In the embodiments of the invention as thus far described the sensing mechanisms produces a signal, either make or break, upon the axial insertion or withdrawal of the first plug. It is often desirable, however, to produce an advance warning of the impending insertion or withdrawal to lessen possible exposure of the operator to light within the adapter while maintaining the simplicity of the foregoing embodiments.

In the embodiment for producing an advance warning, advantage is taken of the LC connector structure which has a cantilevered latching arm thereon for latching the plug to the adapter in the operative position. In order to remove the first plug from the adapter, the latching arm must be depressed to unlatch the plug and enable its removal. In this embodiment of the invention, a Hall effect device is contained in or mounted to the adapter on the outside thereof, and the latching arm has a small magnet affixed thereto near its distal end. The location of the Hall device in the adapter, which is made of a suitable plastic material, is such that it detects the presence of the magnet when the first plug is mounted in its operative position. However, when the latching arm is depressed, the magnet moves away from the Hall device to where the magnetic field thereof is not longer easily detectable and the Hall device signals the control circuit of this condition and the control circuit shuts off the light supplied to the second plug, even though the first plug has not yet been withdrawn. Thus, the light to the second plug is shut of in anticipation off the removal of the first plug.

In still another embodiment of the invention, use is made of the shutter arrangement of the previously mentioned U.S. Pat. No. 5,678,268. Each sidewall of the pivotable shutter has a depending leg near the distal end of one of which is a light emitting device, e.g. an LED, and the distal end of the other of which is a light detecting device. When the shutter is closed, i.e., there being no first plug in the adapter, the light circuit is completed and the power to the second plug is disabled. However, when the shutter is pivoted upward, the circuit is broken and power to the second plug is resumed. In the '268 patent, it is shown how pivoting the shutter upward is a function of the plug itself, thus the plug is at least partially inserted before power to the second plug is resumed, thereby protecting the operator. On the other hand, as the first plug is withdrawn, the locations of the LED and detector are such that the power to the second plug is cut off before the first plug is fully withdrawn.

The various principles and features of the present invention are, as will be seen hereinafter, adaptable to numerous other arrangements. While the safety aspects of the present invention are of paramount importance and are treated in detail, the switching capability of the adapter might readily be adapted for other uses that might occur to workers in the art. These principles and features and the advantages thereof will be more readily apparent from the following detailed description, read in conjunction with the accompanying drawings.

DETAILED DESCRIPTION

Figure 1:
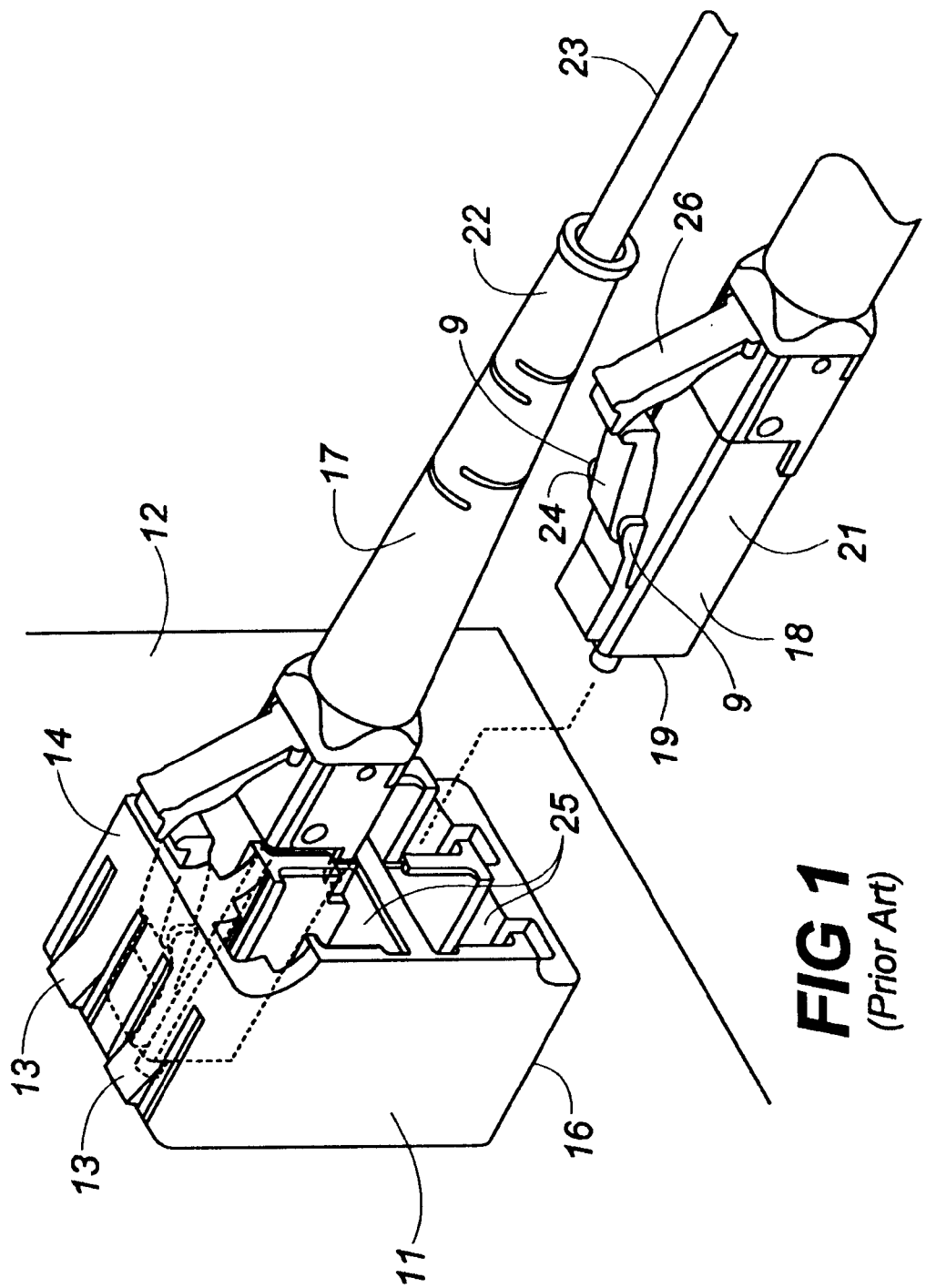
FIG. 1 is a perspective view of a quadraplex adapter and two connector plugs as presently used in the prior art.

FIG. 1 is a perspective view of a quadruplex jack receptacle or adapter 11 mounted on a panel 12 and locked thereto by locking members 13. Adapter 11 is made of suitable plastic material and members 13 are molded into the top and bottom surfaces 14 and 16 respectively. An optical connector 17 of, for example, the LC type is shown mounted in one of the four rectangular cavities 25 of the adapter 11, and a similar connector 18 is shown positioned for insertion into another of the cavities 25 thereof. Each connector comprises a housing 19 and cover 21 that enclose fiber holding structure. Connector 17 has a bend limiting boot 22 and terminates a cable 23. In like manner, connector 18 also terminates a cable, not shown. Both connectors 17 and 18 include a plug end 20 which is insertable in one of the cavities of adapter 11. As best seen with connector 18, each connector includes latching tab or arm 24, molded as part of connector 18, which serves to lock the connector within its receptacle, the cavity. Arm 24 includes a "living hinge" which allows it to be moved up and down relative to the central axis of the connector. A trigger 26 is also molded as part of the connector and has a free end overlying the distal end of arm 24. Trigger 26 has a "living hinge" and when its distal or free end is depressed, it depresses the distal end of arm 24 to unlatch the connector 18 from the adapter (or jack receptacle) 11. It is to be understood that the adapter and connection shown in FIG. 1 are intended to be representative of several different types of connectors and adapters therefor, as is the assembly shown in FIG. 2.

Figure 2:
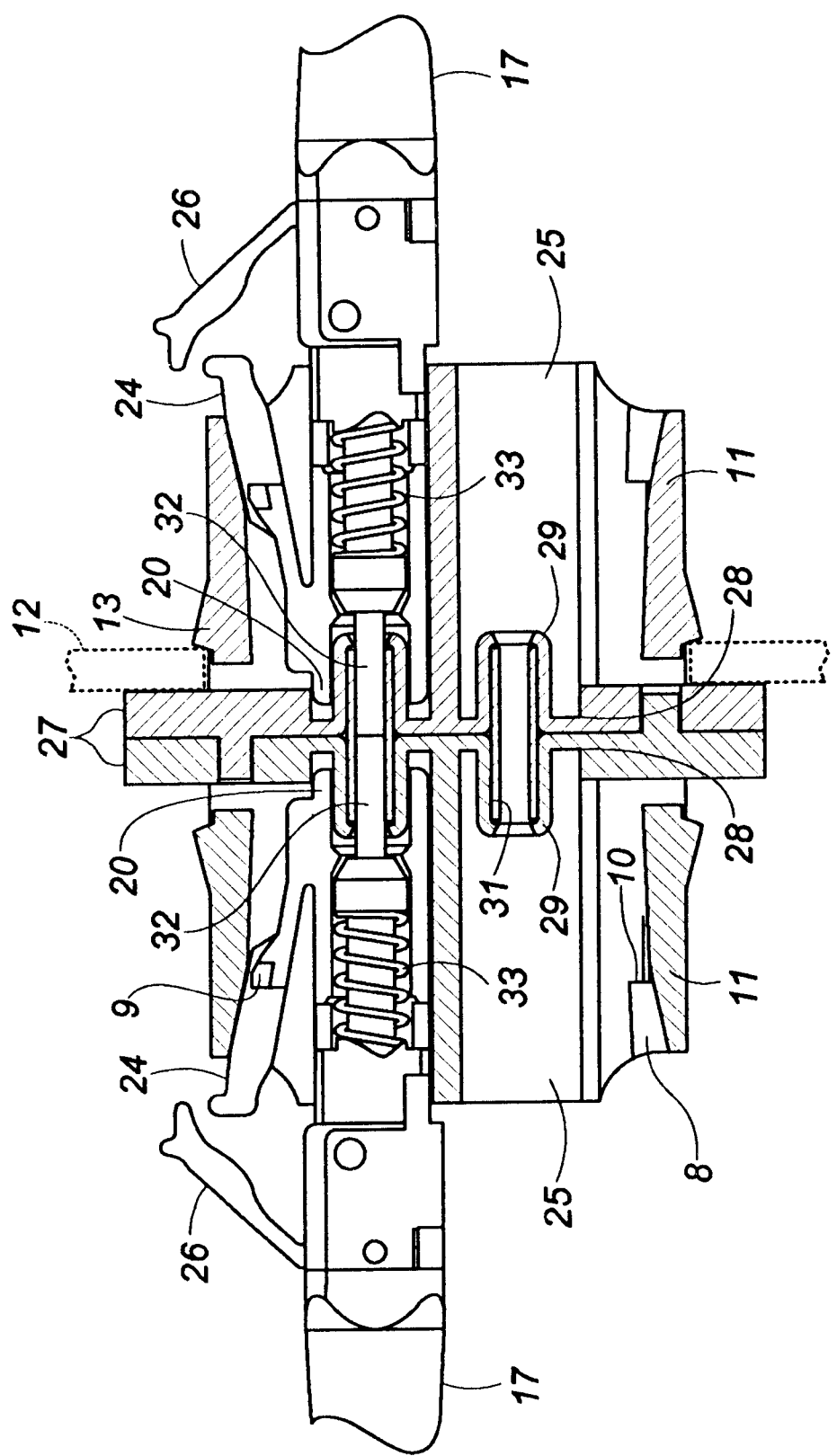
FIG. 2 is a side elevation view in cross-section of connector plugs and an adapter assembly as presently used in the prior art.

FIG. 2 is a cross-sectional view of the arrangement of FIG. 1, and shows a second, mating adapter 11 which mates with the adapter 11 of FIG. 1, each of the adapters having mating flanges 27 which form, or are extensions of, end walls 28 of the adapters 11. Each end wall 28 has a protruding cylindrical member 29 having a bore therein, which, when the adapters are mated aligns with a corresponding bore in the other adapter. The two aligned bores contain an alignment sleeve 31 into which the optical fiber containing ferrules 32 of the two connectors 17 are inserted in butting relationship. When fully inserted in the mated adapters 11, the ends of ferrules 32 are maintained in abutment by means of springs 33, for example. When in this configuration, optical energy is transmitted from one connector to the other with minimized loss. It can be seen from FIG. 2 that if the right hand connector 17, as viewed in FIG. 2, is removed, light energy in the left hand connector 17 will be directed through the now empty cavity 25 of the right hand adapter 11 in an unimpeded path. As discussed hereinbefore, this creates a hazardous condition, especially when the transmitted light is high intensity or power.

Figure 3:
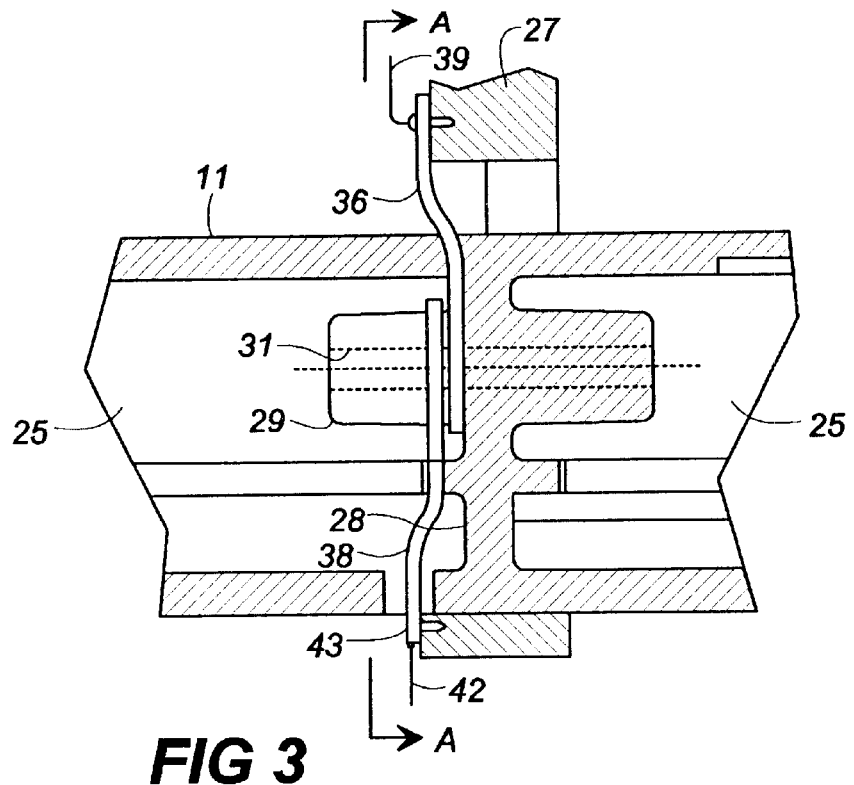
FIG. 3 is a side elevation view in cross-section of a portion of a simplex adapter assembly of a first embodiment of the present invention.
Figure 4:
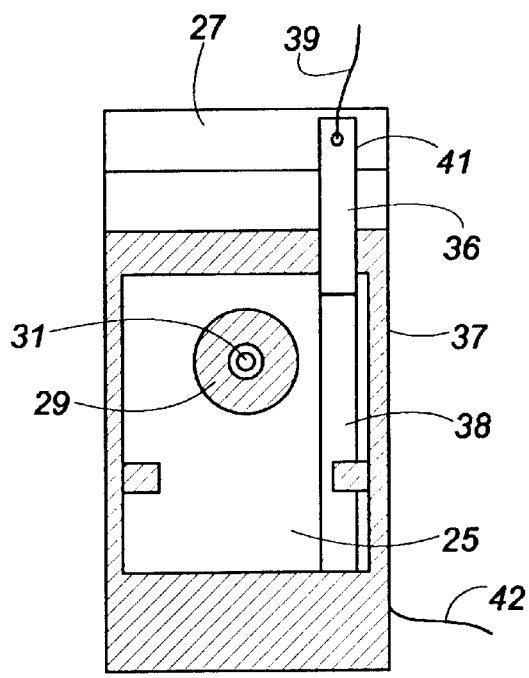
FIG. 4 is a front elevation view in cross-section along the line A—A of the adapter assembly of FIG. 3.

FIGS. 3 and 4 depict a first embodiment of the present invention which is directed to minimizing or eliminating the hazardous condition described in the foregoing. FIG. 3 is a partial view in cross-section of that portion of the connector assembly of FIG. 2 involving the region of abutment of the connector ferrules 32 and FIG. 4 is a cross-sectional elevation view taken along the line A—A of FIG. 3. As best sen in FIG. 3, a first leaf spring 36 of, for example, beryllium copper, is mounted to flange 27 and extends into the rectangular cavity 25, preferably bearing against wall 28. As seen in FIG. 4, spring 36 is positioned between cylindrical member 29 and a side wall 37 of the adapter 11. Spring 36 may be molded into the adapter 11, or it may be riveted or otherwise mounted to flange 27. A second spring 38 extends from an opposite wall of adapter 11, substantially parallel to and overlying spring 36 with a small separation therebetween as best seen in FIG. 3 thereby forming a normally open leaf spring switch. A first electrical lead 39 is connected to the proximal end 41 of spring 36, and a second electrical lead 42 is connected to the proximal end 43. When a plug 17 is inserted into the rectangular cavity 25 it is advanced until latching arm 24 latches it to the adapter. As shown in FIG. 2, the plug end 20, in this position, surrounds cylindrical member 29 and penetrates to a point closely adjacent end wall 28, and, as a consequence, depresses second spring member 38 into contact with spring member 36, thereby completing an electrical connection between leads 39 and 42. Thus, the combination of springs 36 and 38 function as a switch, or, more generically, as a sensing mechanism which registers the presence of a fully inserted connector 17 within adapter 11.

Figure 5:
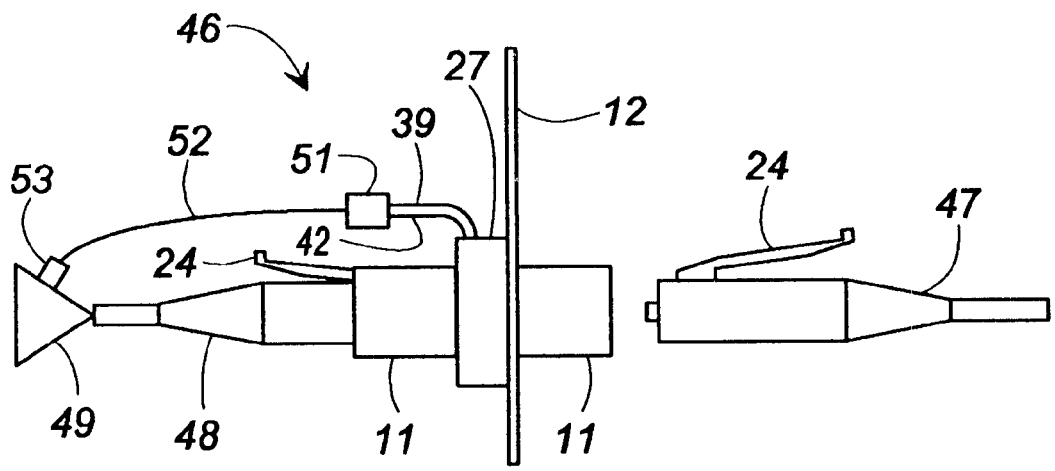
FIG. 5 is a diagrammatic view of a circuit arrangement for use with the adapter assembly of FIGS. 3 and 4, and with subsequent embodiments of the present invention.

FIG. 5 is a diagrammatic view of the system 46 of the present invention, showing the mating adapters 11 mounted to the panel 12, with a first connector plug 47 about to be inserted into an adapter 11 to mate with (abut) a second connector plug 48 positioned and latched into its adapter 11. Connector plug 48 is shown supplied with an optical input from, for example, a laser 49, hence in the arrangement shown, connector 48 is "live" when laser 49 is on. Leads 39 and 42 lead to a control circuit 51 which, when the spring contacts 36 and 38 are not in contact, thereby forming an open switch, circuit 51 generates a control signal which is applied to laser 49 through a suitable connection 52 to, for example, a switch 53 on laser 49 to maintain it in the unenergized, or off, state. When the second plug connector 47 is inserted into its adapter 11 until seated therein, spring members 36 and 38 are pressed into contact with each other, as explained hereinbefore, and the circuit to control member 51 is closed. Control member 51 then generates an "on" signal which is applied to switch 53 to turn the laser 49 on so that normal signal transmission can occur. From the foregoing, it can be appreciated that the switch formed by the springs 36 and 38 functions as a sensing mechanism for sensing the presence or absence of a plug connector in the adapter, and signaling other circuit elements accordingly The operator or installer is thus protected from the harmful effects of laser light energizing unimpeded from an unoccupied opening or receptacle in the adapter. Control element 51 can take any of a number of forms, the design of which are well within the purview of workers in the art and, where the arrangement calls for a voltage source, element 51 can so function. In addition, it is possible to eliminate the control circuit 51 and apply a signal directly to the light source 49 in certain circumstances. In the arrangement of FIG. 5, it is understood that the sensing mechanism formed by the leaf springs 36 and 38 is part of a circuit within control circuit 51 including a voltage (or current) source which is part of the signal generating mechanism activated upon closure of the switch formed by leaf springs 36 and 38.

Figure 6:
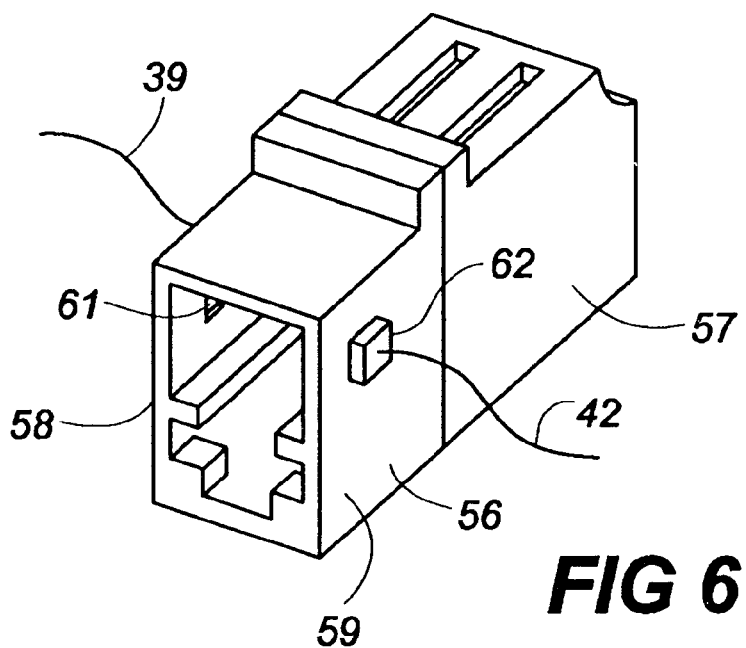
FIG. 6 is a perspective view of a second adapter assembly embodying the principles of the present invention.
Figure 7:
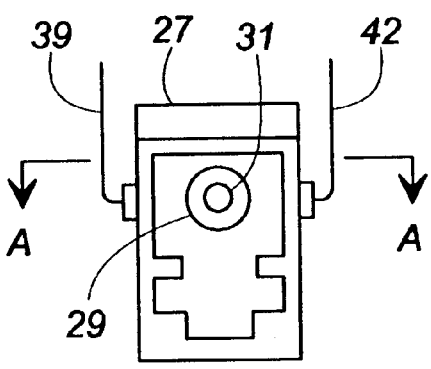
FIG. 7 is a front elevation view of the adapter assembly of FIG. 6.
Figure 8:
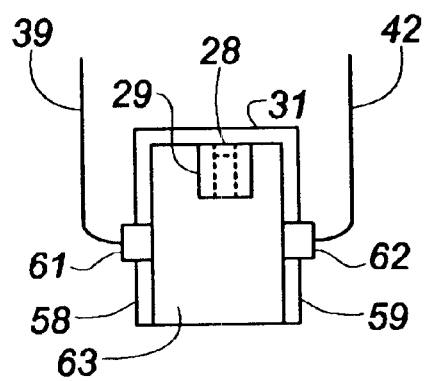
FIG. 8 is a plan view of the adapter assembly of FIGS. 6 and 7 in cross-section along the line A—A of FIG. 7.

FIG. 6 is a perspective view of another embodiment of the invention, of which FIG. 7 is a front elevation view and FIG. 8 is a plan view in cross-section along the line A—A of FIG. 7. To avoid confusion, parts in these figures that correspond to like parts in preceding figures bear the same reference numerals.

FIG. 6 depicts first and second mated adapters 56 and 57. Mounted in diametrically opposed openings in side walls 58 and 59 of adapter 56 are a light source 61, such as, for example, an LED, and a light detector 62 preferably directly opposite source 61. Lead 39 which can actually be more than one wire connects the light source 61 to the control circuit 51 which supplies the necessary power thereto, and lead 42 which can also be, if necessary, more than one wire, connects the detector 62 to the control circuit. As best seen in FIG. 8, in the absence of a plug connector is the receptacle 63 of adapter 56, light from source 61 impinges on detector 62, thereby providing an indication of the absence of a connector to control circuit 51, which thereupon generates a control signal to turn laser 49 off. When a plug connector is inserted into receptacle 63, the light beam from source 61 to detector 62 is interrupted, and detector 62 does not send a light indicating signal to circuit 51. In the absence of such a signal, the laser 49 is switched on and normal operation of the connection obtained. In the embodiment of FIGS. 3 and 4, insertion of a plug connector into the adapter completed a circuit to the control circuit 51, but in the arrangement of FIGS. 6, 7, and 8, insertion of a plug connector into the adapter, breaks a circuit of which the light beam is a part. Thus, control circuit 51 is, in the first instance, programmed to turn the laser on, and, in the second instance, to turn the laser off. It is a simple matter to produce the necessary circuitry in circuit 51 to accomplish the desired response to insertion and removal of a plug connector relative to the adapter.

FIGS. 9, 10, 11, and 12 depict an embodiment of the device which makes use of a Hall effect device as the sensing mechanism. Elements in these figures that correspond to elements in FIGS. 3 and 4 bear the same reference numerals.

Figure 9:
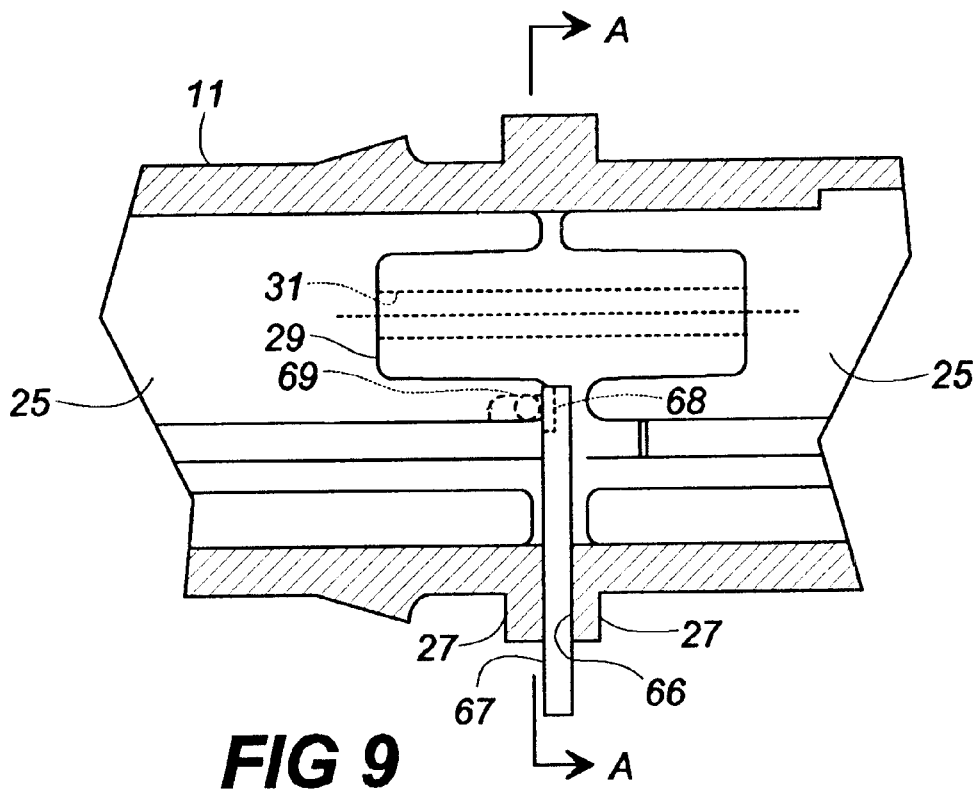
FIG. 9 is a side elevation view in cross-section of a portion of a third adapter assembly embodying the principles of the present invention.
Figure 10:
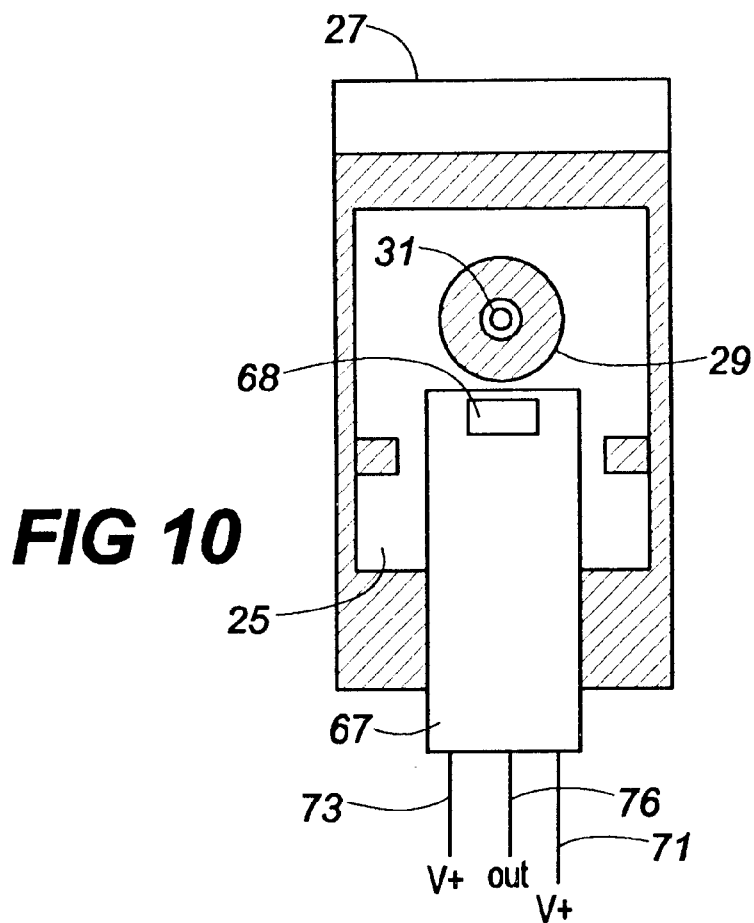
FIG. 10 is a front elevation view of the adapter assembly in cross-section along the line A—A of FIG. 9.
Figure 11:
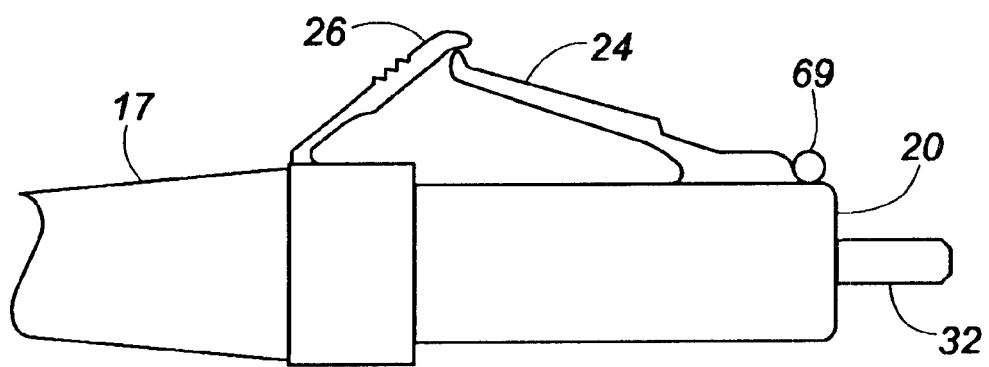
FIG. 11 is a side elevation view of a connector plug for use with the adapter assembly of FIGS. 9 and 10.
Figure 12:
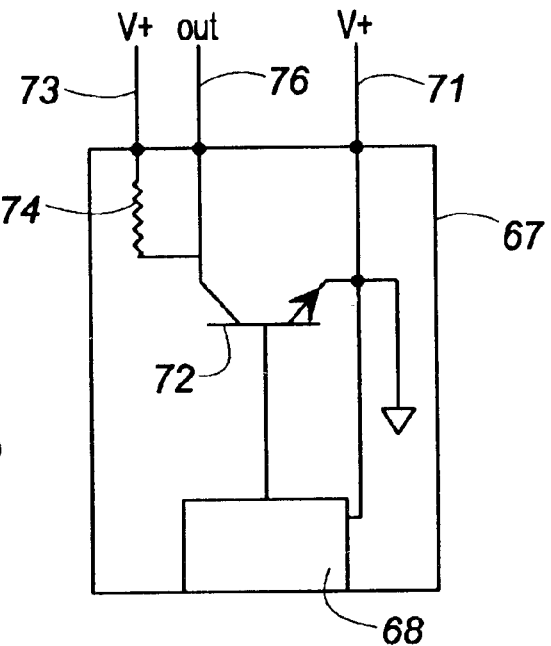
FIG. 12 is a plan view and schematic diagram of a circuit board for use with the adapter assembly of FIGS. 9 and 10.

In FIG. 9, it can be seen that flanges 27 have a slot 66 cut therein at their junction which contains a circuit board 67 which extends into adapter 11 to the cylindrical member 29. As seen in FIG. 12, board 67 has a Hall Effect device 68 mounted on the lower portion thereof. As is known, such a Hall Effect device detects the presence of a magnetic field. To this end, connector plug 17 has mounted on its front end 20 a small magnet 69. When the plug 17 is inserted into the adapter 11 until it is seated, as shown in dashed lines in FIG. 9, the magnet 69 is immediately adjacent the Hall device 68, which detects its magnetic field. With reference to FIG. 12, the Hall device 68, which is biased by a voltage $V_+$, which is applied thereto by lead 71 from a suitable voltage source, which can be, for example, control circuit 51, when it detects a magnetic field, causes a transistor 72 to be activated. Transistor 72 is biased by voltage $V_+$ over lead 73 and resistor 74, and generates an output signal over lead 76 which is applied to control circuit 51. Circuit 51 in turn, turns on laser switch 53 to activate laser 49. When connector plug 17 is removed, by depressing latching arm 24 and pulling it out of opening 25, as the magnet 29 moves away from reusing member (the Hall device 68) its magnetic field is no longer detected in sufficient strength to activate transistor 72, whereby the signal to control circuit 51 ceases and circuit 51 turns laser 49 off by deactivating switch 53. It is to be understood that the circuit arrangement shown in FIG. 12 is representative of any of a number of possible circuits for accomplishing the foregoing operation which are within the purview of workers in the art. From the foregoing it can be seen that the Hall device senses the presence (or absence) of a connector plug relative to adapter 11 and insures that unimpeded laser light will not be emitted through an empty or unoccupied adapter 11.

Figure 13:
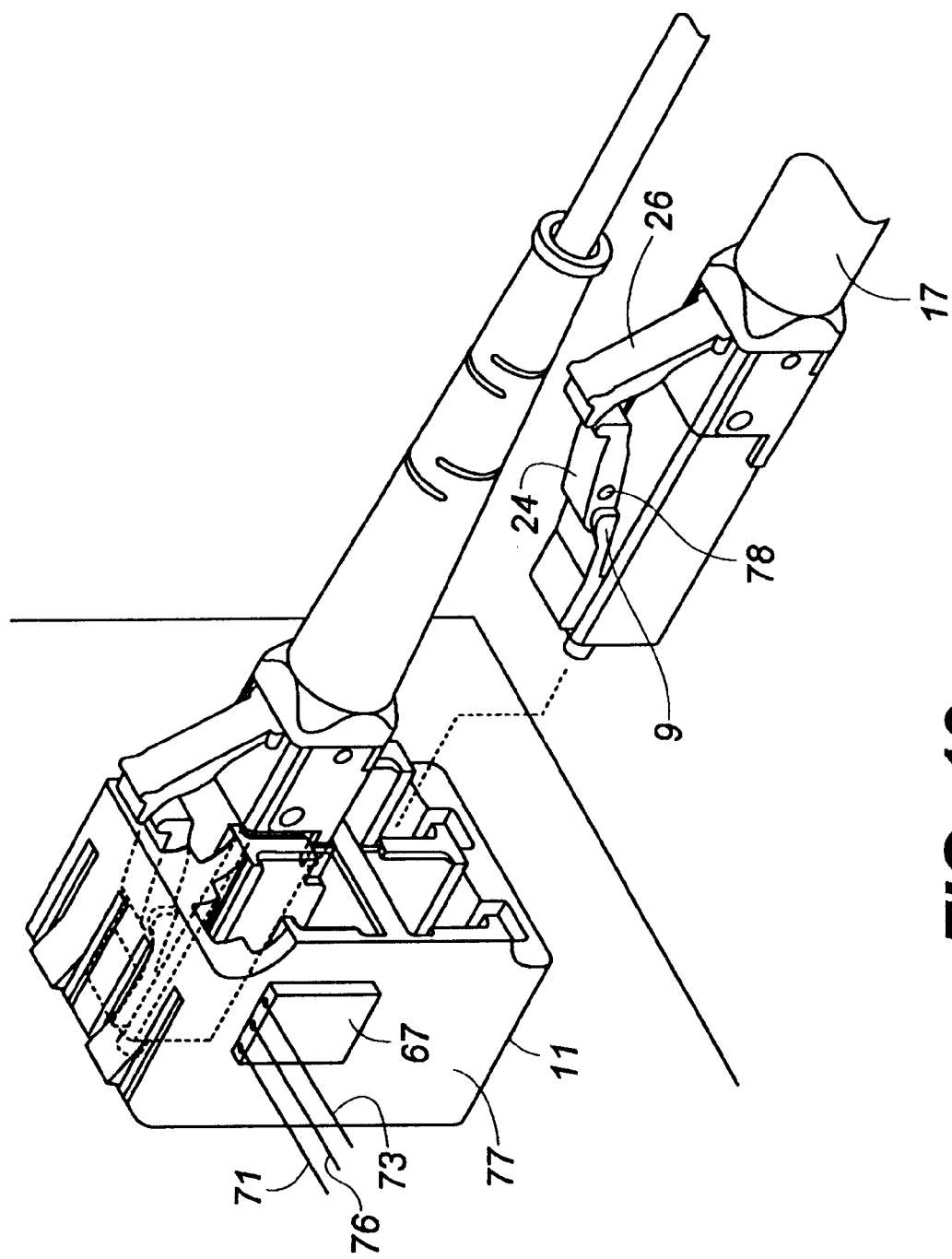
FIG. 13 is a perspective view of still another adapter assembly and connector plug embodying the principles of the present invention.

FIG. 13 is a perspective view of a variation of the arrangement of FIGS. 9 through 12 wherein the sensing mechanism comprises the circuit board 67 containing the Hall Effect device 68 mounted in a side wall 77 of adapter 11 with device 68 preferably being flush with the inner surface of wall 77. Mounted on or in the latching arm 24 is a magnet 78 which, when connector plug 17 is fully seated within adapter 11 is immediately adjacent the Hall device 68 for detection of its magnetic field and thus signaling control circuit 51 of its presence in the adapter 11 in the manner explained hereinbefore. When connector plug 17 is removed from the adapter 11, latching arm 24 is depressed, thereby moving magnet 78 away from the Hall device 68 a distance sufficient to where its magnetic field is no longer detectable by the Hall device 68, which results in laser 49 being deactivated before connector plug 17 is removed. This arrangement signals the impending removal of the connector plug 17 and the laser 49 is deactivated before the plug 17 is fully withdrawn. Thus, the arrangement of FIG. 13 has the additional safety feature of deactivation of the laser 49 while the plug 17 is still within adapter 11, but while it is being removed.

Figure 14:
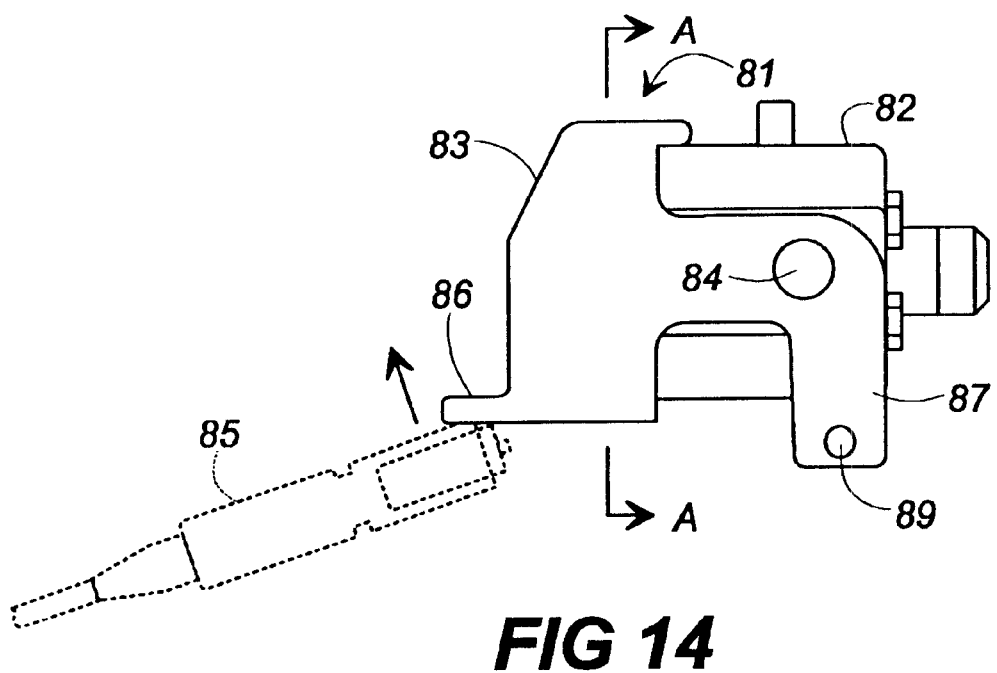
FIG. 14 is a side elevation view of an adapter assembly embodying the principles of the present invention wherein the adapter assembly has a pivotable shutter.
Figure 15:
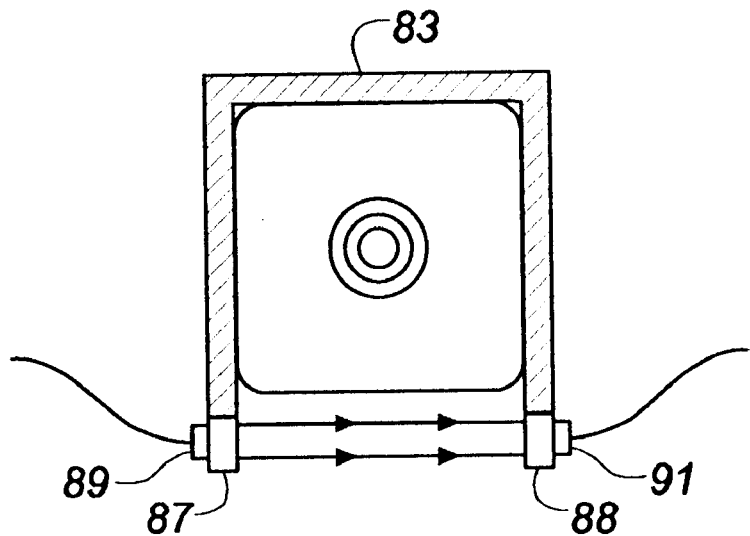
FIG. 15 is a front elevation view of the adapter assembly in cross-section along the line A—A of FIG. 14.
Figure 16:
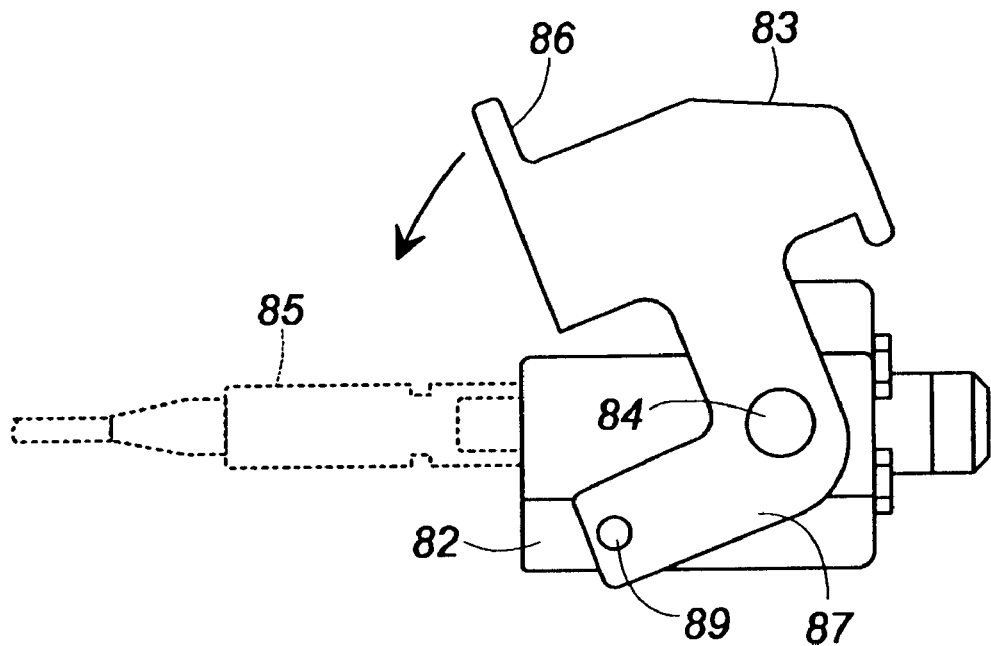
FIG. 16 is a side elevation view of the adapter assembly of FIGS. 14 and 15 with a connector plug partially inserted therein.

FIGS. 14, 15, and 16 are views of still another embodiment of the invention, which represents a modification of the optical shutter arrangement of U.S. Pat. No. 5,687,268 of Stephenson et al., which also incorporates the additional safety feature of advance warning to the control circuit 51 that a connector plug is about to be inserted into, or removed from the adapter 11.

The embodiment of these figures comprises an adapter assembly 18 which, as shown in FIGS. 14 and 15 has an adapter 82 which has an empty receptacle, and a pivotable shutter 83 which covers the opening of the receptacle, as shown. Shutter 83 is pivoted on pivot pin 84 to the position shown in FIG. 16 when a connector plug 85 is inserted in the receptacle of adapter 82. Shutter 83 also has a flange member 86 for pivoting shutter 83 by means of connector plug 85 when the plug is being inserted into adapter 82, as explained in detail in the aforementioned Stephenson et al. '268 patent.

Shutters 83 has first and second depending arms 87 and 88 which extend below the lower surface of adapter 82, as shown in FIG. 14 and in FIG. 15 which is an elevation view in cross-section along the line A—A of FIG. 14. At the distal end of arm 87 is mounted a light emitting device 89 such as an LED, and the distal end of arm 88 has a light detecting device 91 for detecting light emitted from device 89, as shown in FIG. 15. Thus, when there is no connector in adapter assembly 81, more specifically, in adapter 82, the shutter member 83 is closed and, ordinarily, light is blocked from exiting adapter 82, and light emitted from device 89 is detected by device 91, which signals control circuit 51 that one receptacle of adapter 82 is empty. As a consequence, circuit 51 deactivates laser 49, as discussed hereinbefore. This additional safety measure is most useful where the signals carried in the fibers to the adapter are of high power level, as pointed out hereinbefore. When a connector plug 85 is to be inserted into adapter 82, the plug is used to pivot the shutter 83 upward toward the position shown in FIG. 16. As the shutter 83 pivots, the light path between devices 87 and 88 is interrupted and blocked by the body of adapter 82. Thus control circuit 51 no longer receives a signal from device 91, and, in response to the absence of the signal, activates laser 49. It will be apparent to those in the art that the length of arms 87 and 88 and the location thereon of device 89 and 91 can determine at which point in the insertion or extraction of the connector plug the laser is activated or deactivated. Thus, the embodiment of FIGS. 14, 15, and 16 can signal the impending insertion or removal of the connector plug, thereby adding an additional increment of safety.

In the several embodiments of the invention herein discussed, the adapter assembly of the invention has incorporated therein a sensing mechanism which signals the presence or absence of a connector plug in the adapter, and, further, in some of the embodiments, the impending removal or insertion of such plug. While the emphasis herein is on safety, it will be obvious that such information might be useful for other purposes not herein discussed. Additionally, other configurations of the sensing mechanism besides those disclosed might occur to workers in the art. It is to be understood that the various features of the present invention might be incorporated into other types of connector adapters and that other modifications or adaptations might occur to workers in the art. All such variations and modifications are intended to be included herein as being within the scope of the present invention as set forth. Further, in the claims hereinafter, the corresponding structures, materials, acts and equivalents of all means or step-plus-function elements are intended to include any structure, materials, or acts for performing the functions in combination with other elements as specifically claimed.

What is claimed is:

1. An optical fiber coupling adapter assembly comprising:
   an adapter housing having an open receptacle therein for receiving the body portion of a connector plug having a front end from which extends a ferrule, said housing having a rear wall and first and second side walls;
   a cylindrical member extending from said rear wall into said receptacle for receiving the ferrule of the connector plug, said cylindrical member being spaced from said side walls;
   a sensing mechanism having first and second states and positioned to be switched by the body portion of the plug from the first state to the second state upon introduction of the connector plug into the receptacle and to be switched from the second state to the first state upon withdrawal of the body portion of the connector plug and to produce an indication of the presence or absence of the connector plug relative to the receptacle;
   a pivotable shutter member having a front wall for covering the open receptacle and first and second sides, each being pivotably connected to said adapter;
   said adapter housing having a lower surface;
   an arm depending from each of said sides and having a distal end extending below said lower surface when said shutter is in a closed position covering said open receptacle; and
   said sensing mechanism comprising a light emitting diode in the distal end of one of said arms and a light detecting device in the distal end of the other of said arms for detecting light emitted by said light emitting device when said shutter is in the closed position.

2. An optical fiber connector assembly wherein first and second connector adapters are joined together, each of the adapters comprising first and second side walls and a rear wall forming an open connector plug receptacle for receiving first and second connector plug body portions respectively with ferrules abutting, said first coupling adapter having a front opening and a lower surface, and a light source for applying optical energy to at least the second connector plug, said assembly further comprising:
   a sensing mechanism in said first connector adapter having first and second states ad positioned to be switched by the body portion of the first connector plug from the first state of the second state upon introduction of the connector plug into the receptacle and to be switched from the second state to the first state upon withdrawal of the body portion of the connector plug and to produce a deactivation of the light source connected to the second plug when the state of the sensing mechanism indicates an absence of the first connector plug;
   a control circuit to which said sensing mechanism is connected for generating a signal indicative of the sensed condition for application to the light source; and
   a pivotable shutter member having a front wall for said opening and having first and second sides, each being pivotably connected to said first adapter;
   an arm depending from each of said sides, each of said arms having a distal end extending below said lower surface when said shutter member is in a closed position covering said opening;
   said sensing mechanism comprising a light emitting device in the distal end of one of said arms and a light detecting device in the distal end of the other of said arms for detecting light emitted by said light emitting device when said shutter is in the closed position.

3. An optical fiber connector assembly as claimed in claim 2 wherein said control circuit is connected to said light emitting device for supplying electrical power thereto.

* * * * *